United States Patent
Fujisaki et al.

(10) Patent No.: US 10,644,327 B2
(45) Date of Patent: May 5, 2020

(54) FUEL CELL CATHODE CONTAINING A PEROVSKITE OXIDE

(71) Applicant: NGK INSULATORS, LTD., Nagoya-shi, Aichi (JP)

(72) Inventors: Shinji Fujisaki, Kuwana (JP); Yoshihiko Yamamura, Nagoya (JP); Takashi Ryu, Nagoya (JP); Makoto Ohmori, Nagoya (JP)

(73) Assignee: NGK INSULATORS, LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/862,277

(22) Filed: Jan. 4, 2018

(65) Prior Publication Data

US 2018/0131007 A1 May 10, 2018

Related U.S. Application Data

(63) Continuation of application No. PCT/JP2016/069942, filed on Jul. 5, 2016.

(30) Foreign Application Priority Data

Jul. 7, 2015 (JP) ................................. 2015-135821

(51) Int. Cl.
*H01M 4/90* (2006.01)
*C04B 35/26* (2006.01)
(Continued)

(52) U.S. Cl.
CPC ....... *H01M 4/9033* (2013.01); *C04B 35/2608* (2013.01); *C04B 35/488* (2013.01);
(Continued)

(58) Field of Classification Search
CPC ........ H01M 4/9033; H01M 2008/1293; C04B 35/00; Y02P 70/56
See application file for complete search history.

(56) References Cited

U.S. PATENT DOCUMENTS 5,489,483 A    2/1996  Soma et al.
2013/0244132 A1*  9/2013  Ohmori ................. B01J 23/002
                                                  429/482
(Continued)

FOREIGN PATENT DOCUMENTS

JP    07-118076 A    5/1995
JP    07-277848 A    10/1995
(Continued)

OTHER PUBLICATIONS

Transmittal and English translation of International Preliminary Report on Patentability for PCT/JP2016/069942, dated Jan. 18, 2018 (2 pgs.).

(Continued)

*Primary Examiner* — Maria Laios
(74) *Attorney, Agent, or Firm* — Flynn Thiel, P.C.

(57) ABSTRACT

A fuel cell cathode contains a perovskite oxide as a main component. The perovskite oxide is expressed by the general formula $ABO_3$ and including La and Sr at the A site. A solid electrolyte layer is disposed between an anode and the cathode. The cathode has a surface on an opposite side to the solid electrolyte layer. A first ratio of a Sr concentration relative to an La concentration is less than or equal to 4 times a second ratio of the Sr concentration relative to the La concentration. The first ratio is detected by the use of X-ray photoelectron spectroscopy on the surface of the cathode. The second ratio of a Sr concentration relative to a La concentration is detected by the use of X-ray photoelectron spectroscopy on an exposed surface exposed by surface processing of the surface and positioned within 5 nm of the surface in relation to a direction of thickness.

2 Claims, 4 Drawing Sheets

(51) Int. Cl.
*C04B 35/488* (2006.01)
*C04B 35/505* (2006.01)
*H01M 4/86* (2006.01)
*H01M 8/1253* (2016.01)
*H01M 8/124* (2016.01)

(52) U.S. Cl.
CPC .... *C04B 35/505* (2013.01); *C04B 2235/3201* (2013.01); *C04B 2235/3208* (2013.01); *C04B 2235/3213* (2013.01); *C04B 2235/3215* (2013.01); *C04B 2235/3225* (2013.01); *C04B 2235/3227* (2013.01); *C04B 2235/3246* (2013.01); *C04B 2235/3275* (2013.01); *C04B 2235/3279* (2013.01); *C04B 2235/72* (2013.01); *C04B 2235/725* (2013.01); *C04B 2235/768* (2013.01); *H01M 4/8605* (2013.01); *H01M 4/8668* (2013.01); *H01M 8/1253* (2013.01); *H01M 2008/1293* (2013.01); *Y02E 60/525* (2013.01); *Y02P 70/56* (2015.11)

(56) References Cited

U.S. PATENT DOCUMENTS

2014/0162149 A1   6/2014   Niimi et al.
2014/0315116 A1   10/2014  Ohmori et al.
2018/0323440 A1   11/2018  Ohmori et al.

FOREIGN PATENT DOCUMENTS

JP   2006-032132 A   2/2006
JP   2013-191569 A   9/2013
JP   2014-135271 A   7/2014
JP   2017-022105 A   1/2017

OTHER PUBLICATIONS

English translation of Written Opinion of the International Searching Authority for PCT/JP2016/069942 dated Sep. 20, 2016 (6 pgs.).
International Search Report for PCT/JP2016/069942 (2 pgs).
Mechanism of $La_{0.6}Sr_{0.4}Co_{0.2}Fe_{0.8}O_3$ cathode degradation, by Dongjo OH et al, J. Materials Research Society, 2012, vol. 27, No. 15, pp. 1992-1999.
English Written Opinion of the International Searching Authority for corresponding PCT/JP2016/069942 (6 pages).
"Impact of humid atmospheres on oxygen exchange properties, surface-near elemental composition, and surface morphology of La0.6Sr0.4CoO3-δ", by Edith Bucher et al, Solid State Ionics, vol. 208 (2012) pp. 43-51 (9 pages).
Notice of Reasons for Revocation for corresponding JP application No. 2016-133297 (Patent No. 6261668), dated Oct. 3, 2018, with English translation and partial translation of Written opposition to the grant of the patent (23 pages).
Notice of Reasons for Revocation for corresponding JP application No. 2017-080448 (Patent No. 6267386), dated Oct. 3, 2018, with English translation and partial translation of Written opposition to the grant of the patent (24 pages).

\* cited by examiner

FIG. 4

FUEL CELL CATHODE CONTAINING A PEROVSKITE OXIDE

CROSS-REFERENCE TO RELATED APPLICATIONS

This application is a continuation application of PCT/JP2016/069942, filed Jul. 5, 2016, which claims priority to Japanese Application No. 2015-135821, filed Jul. 7, 2015, the entire contents all of which are incorporated herein by reference.

TECHNICAL FIELD

The present invention relates to a fuel cell.

BACKGROUND ART

A typical fuel cell is known to include an anode, a cathode, and a solid electrolyte layer disposed between the anode and the cathode.

The material used in the cathode is suitably a perovskite oxide expressed by the general formula $ABO_3$ and including La (lanthanum) and Sr (strontium) at the A site (For example, reference is made to Japanese Patent Application Laid-Open No. 2006-32132).

SUMMARY OF INVENTION

Technical Problem

However, the fuel cell output may be reduced by repetitive power generation. The present inventors have gained the new insight that one cause of a reduction in output is deterioration of the cathode, and that one cause of such cathode deterioration of the cathode is the presence on the cathode surface of extra Sr in excess of the stoichiometric ratio.

The present invention is proposed based on the new insight above, and has the object of providing a fuel cell that inhibits a reduction in output.

Solution to Problem

The fuel cell according to the present invention has an anode, a cathode and a solid electrolyte layer. The cathode contains a perovskite oxide as a main component. The perovskite oxide is expressed by the general formula ABO3 and including La and Sr at the A site. The solid electrolyte layer is disposed between the anode and the cathode. The cathode has a surface on opposite side to the solid electrolyte layer. A first ratio of a Sr concentration relative to an La concentration is less than or equal to 4 times a second ratio of the Sr concentration relative to the La concentration. The first ratio is detected by use of X-ray photoelectron spectroscopy on the surface of the cathode. The second ratio of a Sr concentration relative to a La concentration is detected by use of X-ray photoelectron spectroscopy on an exposed surface. The exposed surface is exposed by surface processing of the surface. The exposed surface is positioned within 5 nm of the surface in relation to a direction of thickness.

Advantageous Effects of Invention

The present invention provides a fuel cell that inhibits a reduction in output.

DESCRIPTION OF EMBODIMENTS

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Fuel Cell 10

The configuration of a fuel cell 10 will be described making reference to the drawings. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type, or the like.

Figure 1:
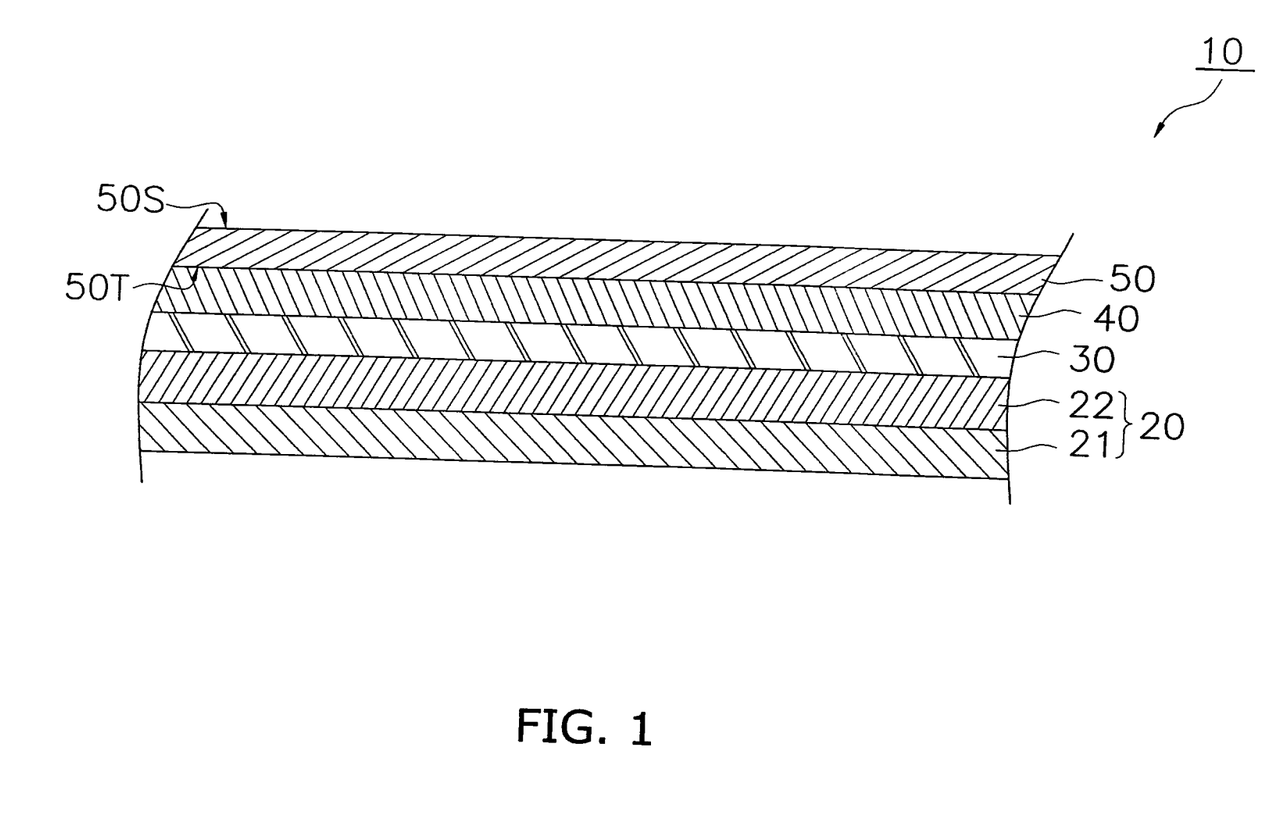
FIG. 1 is a cross sectional view illustrating a configuration of a fuel cell.

FIG. 1 is a cross sectional view illustrating a configuration of a fuel cell 10. The fuel cell 10 includes an anode 20, a solid electrolyte layer 30, a barrier layer 40 and a cathode 50.

The anode 20 functions as the anode for the fuel cell 10. As illustrated in FIG. 1, the anode 20 includes an anode current collector 21 and an anode active layer 22.

The anode current collector 21 is configured as a porous body that exhibits a superior gas permeability. The constituent material configuring the anode current collector 21 includes use of a material that is used in the anode current collector of a conventional SOFC, and for example, includes NiO(nickel oxide)-8YSZ (8 mol % of yttria-stabilized zirconia), or NiO—$Y_2O_3$ (yttria). When NiO is included in the anode current collector 21, at least a portion of the NiO may be reduced to Ni during operation of the fuel cell 10. The thickness of the anode current collector 21 may be configured to be, for example, 0.1 mm to 5.0 mm.

The anode active layer 22 is disposed on the anode current collector 21. The anode active layer 22 is configured as a porous body that is denser than the anode current collector 21. The constituent material for the anode active layer 22 includes use of a material used in an anode active layer of a conventional SOFC, and for example, includes NiO-8YSZ. When NiO is included in the anode active layer 22, at least a portion of the NiO may be reduced to Ni during operation of the fuel cell 10. The thickness of the anode active layer 22 may be configured to be, for example, 5.0 μm to 30 μm.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable the permeation of oxygen ions that are produced by the cathode 50. The solid electrolyte layer 30 is denser than the anode 20 and the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent: zirconia) of the stabilizing agent to zirconia in the solid electrolyte layer 30 may be configured to be approximately 3:97~20:80. Therefore the material used in the solid electrolyte layer 30 includes 3YSZ, 8YSZ, and 10YSZ, or ScSZ (zirconia stabilized with scandia), or the like. The thickness of the solid electrolyte layer 30 for example may be configured as 3 μm to 30 μm.

In the present embodiment, the term "composition X contains as a main component composition Y" means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits the formation of a high resistivity layer between the solid electrolyte layer 30 and the cathode 50. The barrier layer 40 is denser than the anode 20 or the cathode 50. The barrier layer 40 may include a main component of a ceria-based material such as GDC (gadolinium-doped ceria), SDC (samarium-doped ceria), or the like. The thickness of the barrier layer 40 may be configured to be, for example, 3 μm to 20 μm.

The cathode 50 is disposed on the barrier layer 40. The cathode 50 functions as a cathode for the fuel cell 10. The cathode 50 is configured as a porous body.

The cathode 50 contains a perovskite oxide expressed by the general formula $ABO_3$ and including La (lanthanum) and Sr (strontium) at the A site, as a main component. This type of perovskite oxide includes (La, Sr)(Co, Fe)$O_3$: (lanthanum strontium cobalt ferrite), (La, Sr) Fe$O_3$: (lanthanum strontium ferrite), (La, Sr)Co$O_3$: (lanthanum strontium cobaltite), (La, Sr) Mn$O_3$: (lanthanum strontium manganate), or the like. However there is no limitation in this regard.

Although the A site of the perovskite oxide that configures the cathode 50 may be unavoidably contaminated by impurities, it is preferred that the amount of such impurities in the cathode 50 is low. More specifically, although the A site may be unavoidably contaminated by impurities such as Ba, Ca, Na and K, it is preferred that the total concentration of Ba, Ca, Na and K in the cathode 50 is less than or equal to 2000 ppm. In this manner, it is possible to further inhibit Sr from concentrating on the first surface 50S of the cathode 50 during firing of the cathode 50.

The respective concentrations of Ba, Ca, Na and K are obtained by the use of a method of secondary ion mass spectrometry. Although there is no particular limitation on the respective concentrations of Ba, Ca, Na and K, a configuration is possible in which the Ba concentration is 10 to 1400 ppm, the Ca concentration is 10 to 400 ppm, the Na concentration is 10 to 100 ppm, and the K concentration is 10 to 100 ppm.

The cathode 50 has a first surface 50S and a second surface 50T. The first surface 50S is a surface that is opposite to the solid electrolyte layer 30. The microstructure of the cathode 50 in proximity to the first surface 50S will be described below. The second surface 50T is the surface on the solid electrolyte layer 30 side. In the present embodiment, since the fuel cell 10 includes the barrier layer 40, the cathode 50 makes contact with the barrier layer 40 at the second surface 50T. That is to say, in the present embodiment, the second surface 50T is the interface between the cathode 50 and the barrier layer 40.

The second surface 50T may be determined based on a line of rapid change in a concentration distribution of a predetermined component when mapping component concentrations in a cross section that is parallel to the direction of thickness in the cathode 50 and the barrier layer 40. More specifically, the second surface 50T is taken to be the line at which the concentration of an element that is substantially included in only one of the cathode 50 or the barrier layer 40 takes a value of 10% of the maximum concentration in an inner portion of that component.

Microstructure of Cathode 50

Figure 2:
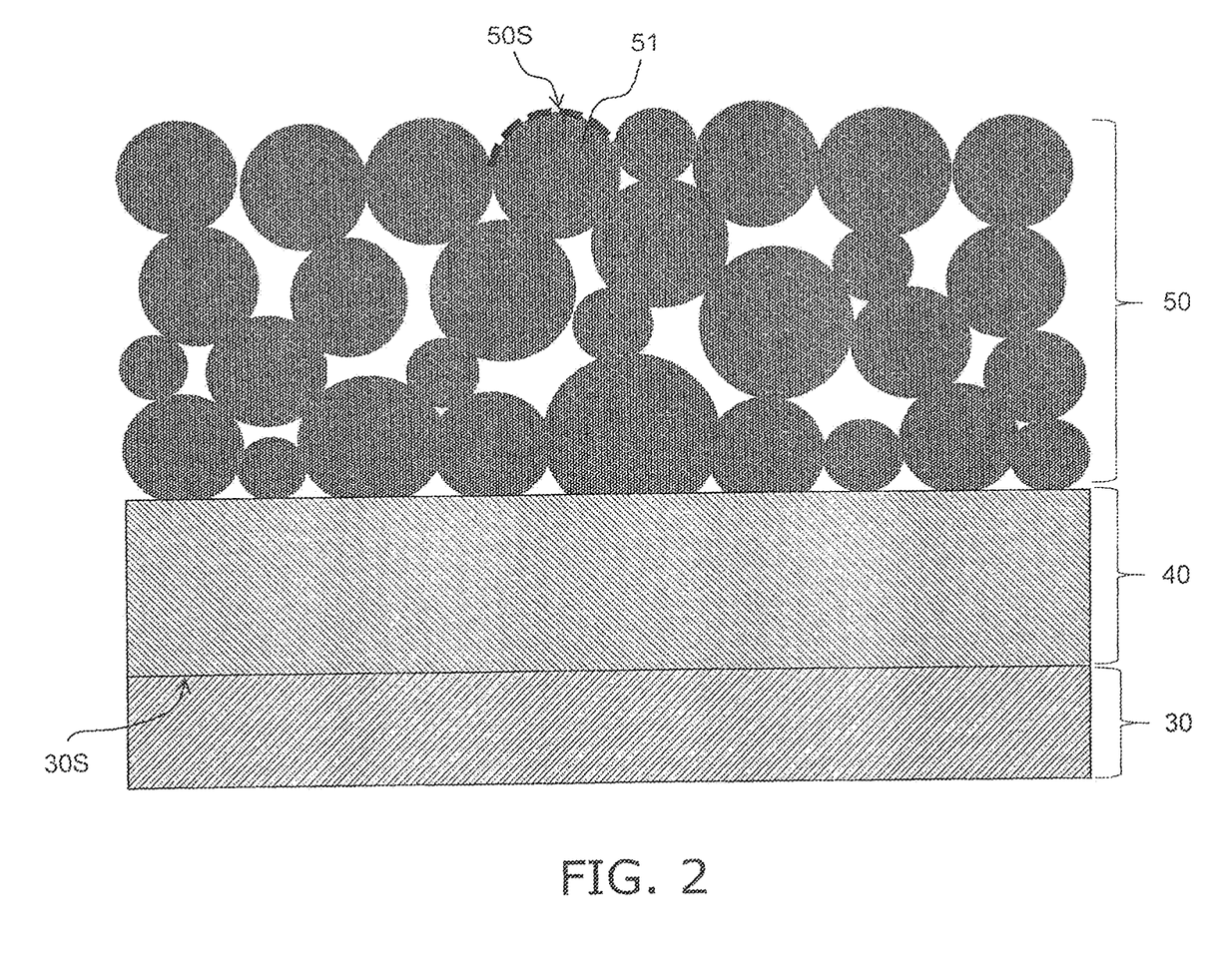
FIG. 2 is a cross sectional view illustrating a surface of a cathode.

The microstructure of the cathode 50 will be described below making reference to the drawings. FIG. 2 is a schematic illustration of the cross section of the cathode 50.

As illustrated in FIG. 2, the cathode 50 is formed by stacking of cathode particles 51 in the direction of thickness. The thickness direction as defined in the present embodiment is a direction that is perpendicular to a cathode side surface 30S of the solid electrolyte layer 30. The cathode particles 51 are configured by a perovskite oxide expressed by the general formula $ABO_3$ and including La and Sr at the A site.

The element distribution in the first surface 50S of the cathode 50 is detected by the use of X-ray photoelectron spectroscopy (XPS). Irradiation by X rays of the uppermost surface of the cathode particles 51 is schematically illustrated by the broken line in FIG. 2.

When the respective atomic concentration of La and Sr is detected by X-ray photoelectron spectroscopy on the first surface 50S, there is no particular limitation on a first ratio (Sr concentration/La concentration) R1 that is the ratio of the detected atomic concentration of Sr (referred to below as "Sr concentration") relative to the detected atomic concentration of La (referred to below as "La concentration"), and such a ratio may vary in response to the material composition of the cathode 50. For example, when the cathode 50 is configured as $(La_{0.6}Sr_{0.4})(Co_{0.2}Fe_{0.8})O_3$, the first ratio R1 may be configured as greater than or equal to 1.0 and less than or equal to 4.0. In such a configuration, although there is no particular limitation on the Sr concentration, a configuration is possible of greater than or equal to 8 atm % and less than or equal to 12 atm %. Although there is no particular limitation on the La concentration, a configuration is possible of greater than or equal to 3 atm % and less than or equal to 8 atm %.

In the present embodiment, the first ratio R1 is the value of the arithmetic average of a ratio (Sr concentration/La concentration) detected respectively at 5 arbitrary positions on the first surface 50S. Although there is no particular limitation on the position of the 5 arbitrary positions for detection of the Sr concentration and the La concentration, a configuration into equal intervals is possible so as to cover the whole of the first surface 50S as much as possible.

The X-ray photoelectron spectroscopy in the present embodiment is executed using an XPS spectrum that is obtained by use of an MgKα (400 W, 1254.6 eV) X-ray source, an analysis diameter of 800 μmφ, an X-ray angle relative to the sample of 45°, and an angle between the X rays and the spectroscope of 54.7°. The X-ray photoelectron spectroscope includes use of an ESCA-5700ci model manufactured by Physical Electronics Inc.

Figure 3:
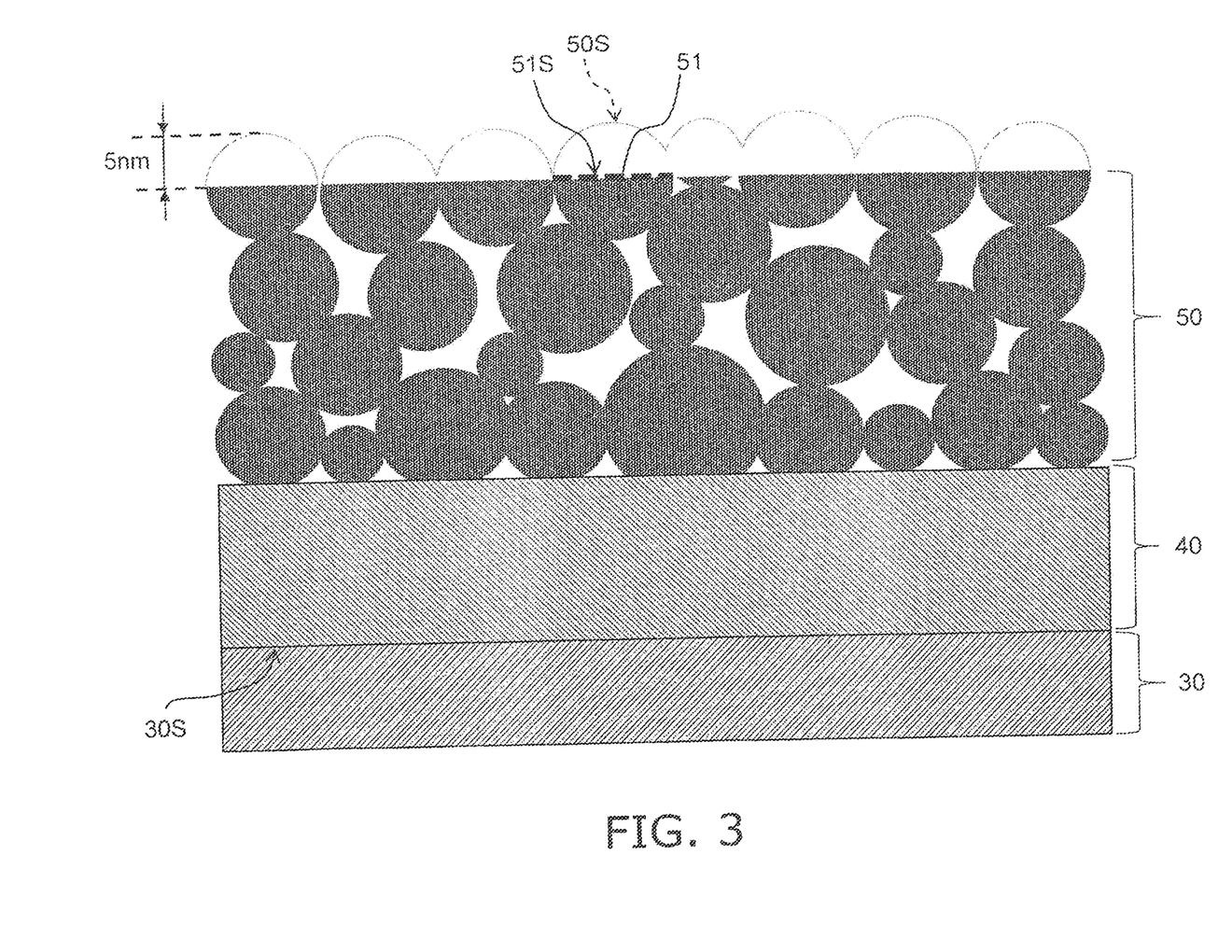
FIG. 3 is a cross sectional view illustrating an exposed surface of a cathode.

Furthermore, as illustrated in FIG. 3, X-ray photoelectron spectroscopy also enables the detection of the element distribution in the exposed surface 51S in an inner portion of the cathode particles 51 due to the use of surface processing of the first surface 50S of the cathode 50 to thereby expose an inner portion of the cathode particles 51. Irradiation by X rays on the exposed surface 51S of the cathode particles 51 is schematically illustrated by the broken line in FIG. 3. As illustrated in FIG. 3, the exposed surface 51S is positioned within 5 nm of the first surface 50S in a thickness direction.

Surface processing to form the exposed surface 51S suitably includes ion etching by the use of an argon ion gun. Ion etching using an argon ion gun enables the accurate formation of the exposed surface 51S in an inner portion that is 5 nm from the first surface 50S by adjusting the ion etching time (0.1 min to 10 min) and the acceleration voltage (0.5 keV to 5 keV).

When the respective atomic concentration of La and Sr is detected by X-ray photoelectron spectroscopy on the exposed surface 51S, there is no particular limitation on a second ratio (Sr concentration/La concentration) R2 that is the ratio of the detected Sr concentration relative to the detected La concentration, and such a ratio may vary in response to the material composition of the cathode 50. For example, when the cathode 50 is configured as $(La_{0.6}Sr_{0.4})(Co_{0.2}Fe_{0.8})O_3$, the second ratio R2 may be configured to be greater than or equal to 1.0 and less than or equal to 1.5. In such a configuration, although there is no particular limitation on the Sr concentration, a configuration is possible of greater than or equal to 10 atm % and less than or equal to 12 atm %. Although there is no particular limitation on the La concentration, a configuration is possible of greater than or equal to 8 atm % and less than or equal to 10 atm %.

In the present embodiment, the second ratio R2 is the value of the arithmetic average of a ratio (Sr concentration/La concentration) detected respectively at 5 arbitrary positions on the exposed surface 51S. Although there is no particular limitation on the position of the 5 arbitrary positions for detection of the Sr concentration and the La concentration, a configuration into equal intervals is possible so as to cover the whole of the exposed surface 51S as much as possible.

In this context, the first ratio R1 on the first surface 50S in the present embodiment is less than or equal to 4 times the second ratio R2 on the exposed surface 51S. That is to say, the relationship R1≤4×R2 is established. In this manner, Sr can be inhibited from concentrating on the first surface 50S by suppressing the difference between the first ratio R1 and the second ratio R2. Therefore since the production of SrO on the first surface 50S is inhibited and thereby a reaction between SrO and S (sulfur) that for example is contained in minute quantities in the oxidant gas (for example, air) is suppressed, it is possible to inhibit a production of $SrSO_4$ that is a cause of deterioration of the cathode 50. As a result, it is possible to reduce the reduction in the output of the fuel cell 10.

The first ratio R1 on the first surface 50S may be configured to be greater than or equal to 0.8 times the second ratio R2 on the exposed surface 51S. The first ratio R1 is preferably greater than or equal to 1.0 times the second ratio R2. In this manner, it is possible to suppress the production of cracking on an outer surface of the cathode after firing.

Method of Manufacturing Fuel Cell 10

Next, an example will be described of a manufacture method for the fuel cell 10.

Firstly, a green body for the anode current collector 21 is formed by molding an anode current collector material powder using a die press molding method.

Then, a slurry for the anode active layer is formed by adding PVA (polyvinyl alcohol) as a binder to a mixture of a pore forming agent (for example, PMMA) and the anode active layer material powder. The slurry for the anode active layer is printed onto the green body of the anode current collector 21 using a printing method or the like to thereby form a green body for the anode active layer 22. The green body for the anode 20 is formed as described above.

Next, a slurry for the solid electrolyte layer is prepared by mixing terpineol and a binder with a solid electrolyte layer material powder. The slurry for the solid electrolyte layer is coated onto the green body of the anode active layer 22 using a printing method or the like to thereby form a green body for the solid electrolyte layer 30.

Next, a slurry for the barrier layer is prepared by mixing terpineol and a binder with a barrier layer material powder. The slurry for the barrier layer is coated onto the green body of an intermediate layer 40 using a printing method or the like to thereby form a green body for the barrier layer Next, the green bodies respectively for the anode 20, the solid electrolyte layer 30 and the barrier layer 40 are fired (1350 to 1450° C., 1 to 20 hours) to form the anode 20, the solid electrolyte layer 30 and the barrier layer 40.

Then, a perovskite oxide material expressed by the general formula $ABO_3$ and including La and Sr at the A site is prepared. It is preferred that the total concentration of impurities (Ba, Ca, Na and K) in the A site of the perovskite oxide is less than or equal to 2000 ppm. In this manner, it is possible to further inhibit Sr from concentrating on the first surface 50S of the cathode 50 during firing as described below.

Next, a cathode slurry is prepared by mixing the perovskite oxide material, water and a binder in a ball mill for 24 hours.

Then the cathode slurry is coated onto the barrier layer 40 by a printing method or the like to thereby form a green body for the cathode 50.

The green body for the cathode 50 is fired (1000 to 1100° C. 1 to 10 hours) to form the cathode 50. At this time, it is possible to inhibit Sr from concentrating on the first surface 50S of the cathode 50 by using a firing atmosphere with a high oxygen concentration. More specifically, as discussed above, the first ratio R1 on the first surface 50S can be configured to be less than or equal to 4 times the second ratio R2 in the exposed surface 51S by firing the green body for the cathode 50 in an oxygen-rich atmosphere that is a pure oxygen atmosphere or has an oxygen concentration of greater than or equal to 40%.

Furthermore, after firing of the cathode 50, it is preferred that the firing atmosphere with a high oxygen concentration is maintained during temperature fall. More specifically, it is possible to adjust the first ratio R1 on the first surface 50S to the second ratio R2 on the exposed surface 51S by allowing the temperature of the green body for the cathode 50 to fall to the ambient temperature in an oxygen-rich atmosphere that is a pure oxygen atmosphere or has an oxygen concentration of greater than or equal to 40%.

Other Embodiments

The present invention is not limited to the above embodiment, and various changes or modifications may be added within a scope that does not depart from the scope of the invention.

Figure 4:
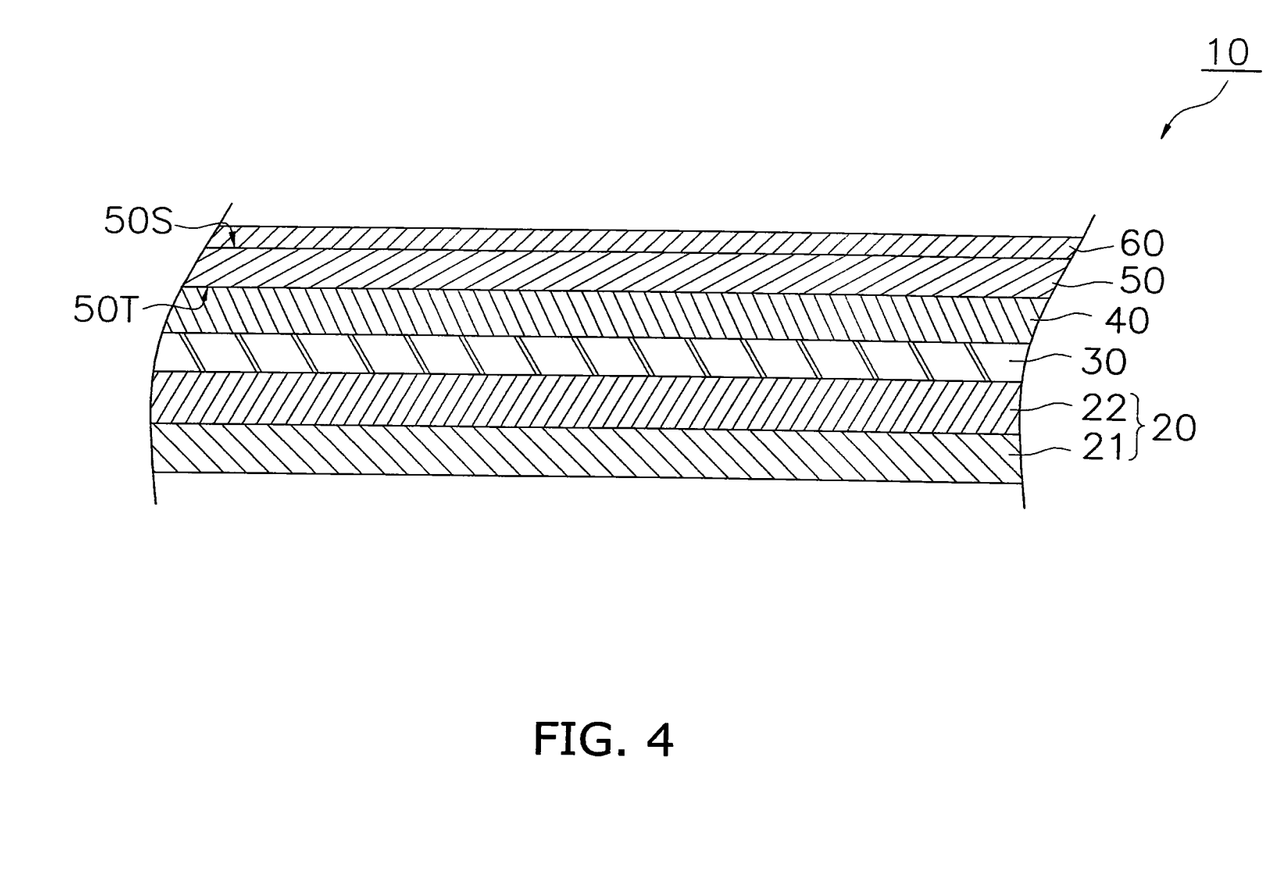
FIG. 4 is a cross sectional view illustrating another configuration of a fuel cell.

(A) As illustrated in FIG. 4, the fuel cell 10 may include a current collector 60 that is disposed on the cathode 50. Although there is no particular limitation on the thickness of the current collector 60, it may be configured with a thickness of 30 μm to 500 μm.

The material used in the current collecting layer 60 preferably exhibits a smaller electrical resistance than the material used in the cathode 50. The current collector 60 can be configured by the perovskite composite oxide expressed by the composition formula (1) below. However there is no limitation in this regard.

$$La_m(Ni_{1-x-y}Fe_xCu_y)_nO_{3-\delta} \quad (1)$$

A substance other than La may be contained in the A site of composition formula (1), and a substance other than Ni, Fe or Cu may be contained in the B site. In composition formula (1), m and n are greater than or equal to 0.95 and less than or equal to 1.05, x (Fe) is greater than or equal to 0.03 and less than or equal to 0.3, y (Cu) is greater than or equal to 0.05 and less than or equal to 0.5, and δ is greater than or equal to 0 and less than or equal to 0.8.

After forming the green body for the current collector 60 on the green body for the cathode 50 by use of a current collecting layer slurry formed by mixing a binder, and water with the material for the current collector 60, the current collector 60 is prepared by firing (1000 to 1100° C., 1 to 10 hours) the respective green bodies for the cathode 50 and current collector 60.

When the fuel cell 10 includes the current collector 60, the cathode 50 makes contact with the current collector 60 at the first surface 50S. That is to say, the first surface 50S is the interface between the cathode 50 and the current collector 60. The first surface 50S may be determined based on a line of rapid change in a concentration distribution of a predetermined component when mapping the component concentration in a cross section that is parallel to the direction of thickness in the cathode 50. More specifically, the first surface 50S is taken to be the line at which the concentration of an element that is substantially included in only one of the cathode 50 or the current collector 60 takes a value of 10% of the maximum concentration in an inner portion of that component.

When the first surface 50S of the cathode 50 is subjected to X-ray photoelectron spectroscopy, it is possible to accurately expose the first surface 50S by removing the current collector 60 that is disposed on the cathode 50 by mechanical polishing or etching.

In this manner, even when the fuel cell 10 includes a current collector 60, deterioration of the cathode 50 can be inhibited by suppressing the first ratio R1 (Sr concentration/La concentration) in the first surface 50S to less than or equal to 4 times the second ratio R2 (Sr concentration/La concentration) in the exposed surface 51S.

(B) Although the fuel cell 10 includes a barrier layer 40, the barrier layer 40 may be omitted. In this configuration, the cathode 50 will be disposed on the solid electrolyte layer 30.

(C) Although the barrier layer 40 is configured with a monolayer configuration, a laminated structure may be provided in which a dense barrier layer is laminated (randomly) with a porous barrier layer.

EXAMPLES

Although the examples of a fuel cell according to the present invention will be described below, the present invention is not thereby limited to the following examples.

Preparation of Samples No. 1 to No. 10

A fuel cell according to Samples No. 1 to No. 10 was prepared as described below.

Firstly, a mixed powder was prepared by drying a slurry of a mixture of IPA and a compounding powder of a pore-forming agent (PMMA), $Y_2O_3$ powder and NiO powder in a nitrogen atmosphere.

Next, uniaxial pressing (compaction pressure 50 MPa) was applied to the mixed powder to form a plate of 30 mm length×30 mm width and a thickness of 3 mm. A green body for the anode current collecting layer was prepared by further consolidation of the plate by use of a CIP (compaction pressure: 100 MPa).

Next, a slurry formed from a mixture of IPA and a compounding powder of PMMA and NiO-8YSZ was coated onto the green body for the anode current collecting layer.

Next, a slurry for the solid electrolyte layer was prepared by mixing terpineol and a binder with 8YSZ. Then the slurry for the solid electrolyte layer was coated onto the green body of the anode to thereby form a green body for the solid electrolyte layer.

Then a GDC slurry was prepared, and the GDC slurry was coated onto the green body for the solid electrolyte layer to thereby prepare a green body for the barrier layer.

Next, the green bodies respectively for the anode, the solid electrolyte layer and the barrier layer were fired (1450° C., 5 hours) to form the anode, the solid electrolyte layer and the barrier layer.

Next, a cathode slurry was prepared by mixing terpineol and a binder with the cathode material as shown in Table 1. Then, the cathode slurry was coated onto the green body for the barrier layer to thereby prepare a green body for the cathode.

Next, the cathode was formed by firing (1000° C., 1 hour) the green body for the cathode. At that time, after firing in an oxygen-rich atmosphere in which the oxygen concentration is greater than or equal to 40%, the temperature was allowed to fall while maintaining the oxygen-rich atmosphere in which the oxygen concentration is greater than or equal to 40% so that the proportion (R1/R2) of the first ratio R1 in the surface of the cathode to the second ratio R2 in the exposed surface of an inner portion of the cathode was adjusted as shown in Table 1 (Except for Sample No. 10).

Observation of Cracks in Outer Surface of Cathode

The presence or absence of cracks in an outer surface was confirmed by visual and microscopic observation of the outer surface of the cathode in relation to each of the 10 samples. The results are shown in Table 1.

X-ray Photoelectron Spectroscopy in Proximity to Surface of Cathode

Firstly the Sr concentration and La concentration were detected respectively at 5 arbitrary positions on the uppermost surface of the cathode by X-ray photoelectron spectroscopy (ESCA-5700ci model manufactured by Physical Electronics Inc., X-ray source: MgKα (400 W, 1254.6 eV), analysis diameter: 800 μmφ, X-ray angle relative to sample: 45°, and angle between the X rays and the spectroscope: 54.7°), and then the first ratio R1 of the Sr concentration relative to the La concentration was calculated (as the arithmetic average of the ratio at 5 positions).

Next, 5 nm of the uppermost surface of the cathode was removed with respect to the direction of thickness by the use of ion etching (ion etching time: 1 min, acceleration voltage: 3 keV) by using an argon ion gun. In this manner, the exposed surface of an inner portion of the cathode was formed.

Then, the Sr concentration and La concentration were detected respectively at 5 arbitrary positions on the exposed surface of the cathode by X-ray photoelectron spectroscopy (ESCA-5700ci model manufactured by Physical Electronics Inc., X-ray source: MgKα (400 W, 1254.6 eV), analysis diameter: 800 μmφ, X-ray angle relative to sample: 45°, and angle between the X rays and the spectroscope: 54.7°), and the second ratio R2 of the Sr concentration relative to the La concentration was calculated (as the arithmetic average of the ratio at 5 positions).

The proportion (R1/R2) of the first ratio R1 to the second ratio R2 is shown in Table 1.

Durability Testing

Sample Nos. 1 to No. 10 were heated to 750° C. while supplying nitrogen gas to the anode side and air to the cathode side. When reaching a temperature of 750° C., hydrogen gas was supplied to the anode to perform a reduction process for 3 hours.

Next, a voltage drop rate per 1000 hours is measured as a deterioration rate. A value is used in which a rated current density value is 0.2 A/cm$^2$ at a temperature of 750° C. The measurement results are summarized in Table 1. In the present embodiment, a sample having a deterioration rate of less than or equal to 1.0% is evaluated as having a low deterioration state.

TABLE 1

| Sample No. | Cathode Material | R1/R2 | Deterioration Rate (%) | Cathode Cracks after Firing | Evaluation |
|---|---|---|---|---|---|
| 1 | (La,Sr)(Co,Fe)O$_3$ | 0.8 | 0.31 | Slight Formation (1/10) | ○ |
| 2 | (La,Sr)FeO$_3$ | 1.0 | 0.22 | None (0/10) | ◎ |
| 3 | (La,Sr)(Co,Fe)O$_3$ | 1.2 | 0.25 | None (0/10) | ◎ |
| 4 | (La,Sr)FeO$_3$ | 1.6 | 0.16 | None (0/10) | ◎ |
| 5 | (La,Sr)(Co,Fe)O$_3$ | 2.1 | 0.42 | None (0/10) | ◎ |
| 6 | (La,Sr)FeO$_3$ | 2.6 | 0.24 | None (0/10) | ◎ |
| 7 | (La,Sr)FeO$_3$ | 3.2 | 0.46 | None (0/10) | ◎ |
| 8 | (La,Sr)(Co,Fe)O$_3$ | 3.8 | 0.55 | None (0/10) | ◎ |
| 9 | (La,Sr)(Co,Fe)O$_3$ | 4.0 | 0.36 | None (0/10) | ◎ |
| 10 | (La,Sr)(Co,Fe)O$_3$ | 4.4 | 1.5 | None (0/10) | X |

As shown in Table 1, in those samples in which the first ratio R1 is less than or equal to 4 times the second ratio R2, the deterioration rate of the cathode can be reduced. This feature is due to the fact that production of SrO in an outer surface is inhibited by suppressing the concentration of Sr in an outer surface (the first surface 50S in the present embodiment) of the cathode, and as a result, it is possible to inhibit the production of SrSo$_4$ that is a cause of cathode deterioration.

Furthermore as shown in Table 1, when the first ratio R1 is greater than or equal to 1.0 times the second ratio R2, it is possible to inhibit the production of cracks in the outer surface of the cathode after firing.

What is claimed is:

1. A fuel cell comprising:
   an anode,
   a cathode containing a perovskite oxide as a main component, the perovskite oxide expressed by the general formula ABO$_3$ and including La and Sr at the A site, and
   a solid electrolyte layer disposed between the anode and the cathode,
   the cathode having a surface on opposite side to the solid electrolyte layer, and
   a first ratio of a Sr concentration relative to an La concentration being from 1.2 to 4 times a second ratio of the Sr concentration relative to the La concentration,
   the first ratio being detected by use of X-ray photoelectron spectroscopy on the surface of the cathode, the second ratio of a Sr concentration relative to a La concentration being detected by use of X-ray photoelectron spectroscopy on an exposed surface,
   the exposed surface being exposed by surface processing of the surface,
   the exposed surface being positioned within 5 nm of the surface in relation to a direction of thickness of the cathode.

2. The fuel cell according to claim 1, wherein a total amount of Ba, Ca, Na and K in the A site of the perovskite oxide is less than or equal to 2000 ppm.

* * * * *